United States Patent

Deam

Patent Number: 5,086,207
Date of Patent: Feb. 4, 1992

[54] MONITORING OF ARC WELDING BY ANALYZING MODULATION OF RADIATION FROM CARRIER SIGNALS SUPERIMPOSED ON WELD CURRENT

[76] Inventor: Rowan T. Deam, 11 South Street, Hythe, Southampton SO4 6EA, United Kingdom

[21] Appl. No.: 527,443

[22] Filed: May 23, 1990

Related U.S. Application Data

[63] Continuation-in-part of Ser. No. 329,545, Mar. 28, 1989, abandoned.

[30] Foreign Application Priority Data

Jan. 13, 1989 [GB] United Kingdom ................ 8900738

[51] Int. Cl.$^5$ ............................................. B23K 9/095
[52] U.S. Cl. ........................... 219/130.01; 219/130.21
[58] Field of Search ...................... 219/130.01, 130.21, 219/124.02, 137 R

[56] References Cited

U.S. PATENT DOCUMENTS

| | | | |
|---|---|---|---|
| 4,435,631 | 3/1984 | Drouet et al. ................... | 219/124.02 |
| 4,595,820 | 6/1986 | Richardson ..................... | 219/130.01 |
| 4,711,986 | 12/1987 | Lillquist et al. ................ | 219/130.01 |
| 4,859,830 | 8/1989 | Case, Jr. et al. ............... | 219/130.01 |

Primary Examiner—Clifford C. Shaw
Attorney, Agent, or Firm—Antonelli, Terry, Stout & Kraus

[57] ABSTRACT

A carrier signal is superimposed on the arc current during an arc welding operation, and radiation, either acoustic or light, emitted by the arc is detected and analyzed, with the results being used to control weld penetration.

15 Claims, 1 Drawing Sheet

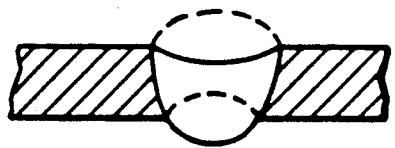
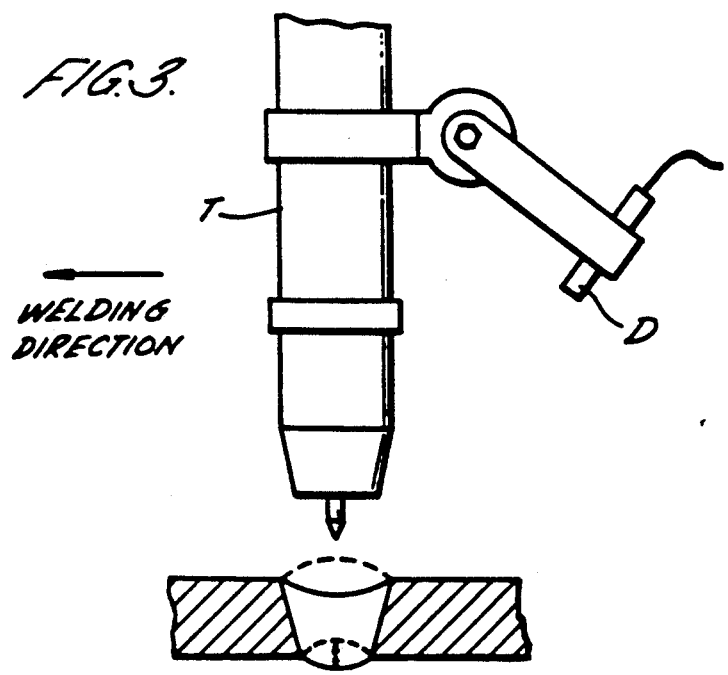

MONITORING OF ARC WELDING BY ANALYZING MODULATION OF RADIATION FROM CARRIER SIGNALS SUPERIMPOSED ON WELD CURRENT

This application is a continuation-in-part of U.S. Pat. application Ser. No. 07/329,545 filed Mar. 28, 1989, now abandoned.

This invention relates to a welding method and apparatus.

Monitoring and controlling the weld penetration in arc welding is important for high quality applications. A weldpool that has overpenetrated will be liable to sag and fall through, leaving a hole. Underpenetrated weldpools will leave a crevice at the backface of the weld joint, which will be a place of weakness and a site for possible corrosion.

A skilled welder can manually effect the necessary control of the welding operation, but it is also known to use automatic control in dependence upon details of parameters of the welding operation.

Known automatic welding operation controllers use radiation from the backface of the weld being produced, i.e. the bottom of the weldpool formed during the welding operation, in order to control the weld penetration depth. However, such controllers cannot be used when the backface of the weld is inaccessible.

Other known controllers use an ultrasonic probe which is contacted with the workpiece near the weldpool to measure weld penetration. However, such controllers have the disadvantage that the probe is generally covered in grease in order to ensure good acoustic coupling, and this grease can contaminate the weld pool.

Another known controller operates by determining weldpool vibration by measuring changes in the arc voltage of the welding apparatus. However, this controller requires the use of a high quality welding power supply in order to maintain a short stable arc and thus ensure an adequate signal to noise ratio in the arc voltage.

According to the present invention there is provided a method of arc welding including the steps of forming an arc to produce a weldpool; causing the weldpool to vibrate; superimposing a carrier signal on the arc current; detecting radiation emitted by the arc; and analyzing the detected radiation to obtain details of parameters of the weldpool.

With the method of this invention, the weldpool is caused to vibrate, exciting capillary waves on the front surface of the weldpool, and radiation emitted by the arc is detected and analyzed, the amplitude, i.e. the intensity, of the detected radiation being directly proportional to the actual length of the arc formed. The state of the weldpool vibration can then be determined by analyzing the detected radiation signal to determine the modulation thereof, and from this the state of weld penetration can be determined. Thus, arc length can be determined from the intensity of the detected radiation signal, while frequency and amplitude of modulation of the detected signal is the weldpool vibration frequency and amplitude, and from these two values details of parameters of the weldpool relative to weld penetration can be obtained, as will be discussed.

A method in which an audible carrier signal is superimposed onto the arc current can be used for manual welding operations, while an inaudible carrier signal can be used in an automatic welding operation, with the emitted radiation from the arc being detected by means of a microphone or a light detector arrangement.

The method of the present invention is an active method in that the carrier signal is positively superimposed on the arc current, rather than a passive method in which the conditions which occur during welding are simply monitored. In the present method, the superimposed carrier signal generates sounds in the arc and also modulates the arc light. Thus, as noted above, the radiation detected and analyzed can be either an acoustic signal detected by the ear of the welder and analyzed by his or her brain, an acoustic signal detected by a microphone and analyzed, for example using a computer, to provide automatic control of the welding, or a light signal detected by a light sensitive arrangement and again analyzed using a computer to provide automatic welding control.

With the method of this invention the light given off by the welding electrode and the workpiece is also modulated by the superimposed carrier signal, and this could have adverse effects on the accuracy of the method. However, the carrier frequency modulation is severely attenuated in solids, e.g. the electrode and the workpiece, at frequencies above about 100 Hz, and since the carrier frequency is preferably well above the weldpool vibration frequency in order to be able to extract the weldpool vibration measurement, these difficulties can be avoided by setting the carrier frequency well above about 100 Hz. Thus, the contribution from the welding electrode and the workpiece to the detected light signal at the carrier frequency can be made negligible.

This invention will now be described by way of example with reference to the drawings, in which:

FIG. 1A illustrates an overpenetrated weld;

FIG. 1B illustrates an underpenetrated weld;

FIG. 1C illustrates a correctly penetrated weld;

FIG. 2A illustrates the mode of vibration of a penetrated weld;

FIG. 2B illustrates the mode of vibration of an underpenetrated weld; and

FIG. 3 illustrates an apparatus for use in carrying out the method of the invention.

Referring now to the drawings, FIG. 1A shows an overpenetrated weld which is sagging and possibly about to fall through, while FIG. 1B shows an underpenetrated weld which has a crevice behind the weld, which can be a position of weakness or corrosion. FIG. 1C shows a correctly penetrated weld which extends through the workpiece but which is not sagging.

For the method of the present invention, the weldpool is caused to vibrate, thus causing capillary waves on the weldpool. A weldpool produced in arc welding can be made to vibrate in its natural mode of oscillation by a short pulse in the welding current or a shockwave generated in the welding gas. FIGS. 2A and 2B show the fundamental modes of vibration of a penetrated and an unpenetrated weldpool. The frequency of vibration is determined by the weldpool's surface tension for practical weldpool sizes, and thus capillary waves are formed. The frequency of the fundamental vibration, $\nu$, can be calculated for a weldpool of mass M, frontface surface area A, surface tension $\sigma$ and density $\rho$.

$$v^2 = \frac{\chi\sigma}{M} \quad (1)$$

where, $\chi$ is a shape or form factor which is approximately unity for practical weldpools.

For unpenetrated weldpools:

$$v^2 = \frac{\chi\sigma}{\rho}(A^{-3/2}) \quad (2)$$

where $\chi$ is the appropriate form factor for unpenetrated weldpools.

Thus, for the same material, the fundamental frequency depends on weldpool mass M for penetrated pools, and on the frontface pool area A for unpenetrated pools.

The distinction between penetrated and unpenetrated weldpools is made by examining their amplitude of vibration. Penetrated pools have a much larger amplitude of vibration than unpenetrated pools. This is due to the way they are excited into vibration. The spatial distribution of the excitation impulse favors larger amplitude vibrations in penetrated pools because the exciting force has a relatively flat profile over most practical weldpool sizes. The amplitude of vibration can be predicted for penetrated weldpools using a simple spring-dashpot model.

For oscillations excited by pulsing the welding current the amplitude is proportional to:

$$(I_p^2 - I^2)t_p \quad (3)$$

where $I_p$ is the pulse current (about 200 A in practice) which lasts for $t_p$ seconds (about 4 ms in practice), and I is the welding current.

For oscillations excited by a shock generated in the welding gas, the amplitude is proportional to:

$$\Delta P A T_p \quad (4)$$

where $\Delta P$ is the pressure of the shock which lasts $t_p$ seconds and A is the frontface area of the pool.

The above expressions enable pool amplituded to be normalized, so that the normalized amplitudes are independent of the exciting impulse. The advantage of using short impulses is that all the frequencies of interest have the same normalization. Exciting impulses are chosen to be strong enough to create pool amplitudes of about 1 mm (peak to peak) in penetrated pools, thereby swamping any "noise".

The working frequency range for penetrated weldpools is from about 20 Hz to 80 Hz. The weldpool frequency at which the weldpool begins to sag depends on the quarter power of the ratio of the weldpool density to surface tension Thus, the "sagging" frequency is relatively insensitive to material properties and is close to 30 Hz for most materials. This is an important result for all positional welding.

The arc light emitted during welding is proportional to arc length, except at very low currents. Thus, as the weldpool vibrates the arc light is modulated in proportion to the arc length; if the amplitude of weldpool vibration is 1 mm when the arc length is 3 mm, the arc light is modulated by 33%.

There are two methods of normalization. Firstly, the detected intensity is normalized by dividing by the mean intensity. The signal is then equal to the amplitude of weldpool vibration divided by the arc length. Secondly, the signal is normalized by the strength of the excitation impulse. This is done by dividing by either expression (3) or expression (4) above, depending on whether the excitation is by pulsing the welding current or by a shock generated in the welding gas. The normalization means that calibration is not necessary.

The resolution of any frequency measurement depends on the time taken to make the measurement. If T is the time taken, a resolution $\Delta v$, in frequency is obtained. Where:

$$\Delta v T = 1 \quad (5)$$

While welding, a compromise is required between resolution in the weldpool size measurement and how frequently the measurement is made. For control of the welding process, a good compromise is a resolution of 2 Hz, which enables the weldpool mass to be measured to 10% for a 40 Hz pool frequency and the measurement updated every ½ second.

A weld operation is usually defined in terms of arc length or arc voltage, travel speed and welding current. The method of the present invention allows a weld operation to be defined in terms of penetration and weldpool size. Penetration is determined by comparing the amplitude of the normalized weldpool spectra with a threshold value below which the weldpool does not penetrate, and weldpool size is calculated from the fundamental frequency. The method of the invention can be carried out using an IBM PC XT computer to control the following steps:

1. Excite weldpool vibration.
2. Superimpose a carrier signal of at least 100 Hz on the arc current.
3. Detect radiation emitted by the arc as sound or light.
4. Normalize the detected radiation and calculate the spectrum.
5. Determine penetration and weldpool size from the spectrum.
6. Adjust welding current and repeat the cycle.

The cycle time should be slightly longer than the measurement time to allow the computer to perform the calculations needed in the last three steps and also to excite the weldpool Monitoring of the weldpool's fundamental frequency and amplitude of vibration is carried out and can be stored in a file for later use for quality assurance purposes, even if the welding operation employs constant current. Quality control is effected if the welding operation is specified in terms of a target weldpool frequency.

The method of the invention can be used with a variety of materials and geometries, to perform close butt welds in a single pass up to 6 mm thick. The method is tolerant of variations in thickness, heat sinks and fit-up, and can orbitally weld tubes.

FIG. 3 shows an apparatus for use in carrying out the method of the invention. As shown, an arc intensity detector D, comprising, for example, an incoherent glass fiber bundle shrouded in a copper tube, is mounted on the welding torch T and is pointed at the arc provided by the torch. The alignment is not critical; all that is required is that some of the emitted arc light be collected. The collected light is passed by way of an optical fiber cable to processing apparatus (not shown) for processing as discussed above.

If acoustic radiation is to be detected, then the detector D is a microphone rather than a glass fiber bundle detector.

It will be appreciated that both light and acoustic radiation emitted by the arc can be simultaneously detected using an optical fiber cable and a microphone, both types of detected radiation being analyzed as necessary.

The method of this invention is well suited to robotic and automatic welding operations and gives the advantages that the apparatus required for carrying out the method is small, inexpensive, robust, easy to set-up and align at the front face (torch side) of the weld, and requires no calibration Further, weldpool size and penetration can be calculated from measurement of the natural modes of weldpool vibration, so that welding engineers are able to specify their weld procedures in terms of weldpool size and penetration.

The ability to monitor weldpool size and penetration has important consequences on quality control and quality assurance in welding, since weldpool parameters can be measured on-line together with process parameters. This will improve weld quality and reduce the need for post weld inspection since a record of weldpool size along the length of the weld can be kept while welding.

I claim:

1. A method of arc welding comprising the steps of forming an arc to produce a weldpool; positively superimposing a carrier signal on the arc current; causing the weldpool to vibrate so as to modulate the superimposed carrier signal; detecting radiation emitted by the arc; and analyzing the modulation of the detected radiation to obtain details of parameters of the weldpool.

2. A method as claimed in claim 1, in which the weldpool is caused to vibrate by producing a short pulse in the welding current.

3. A method as claimed in claim 1, in which the weldpool is caused to vibrate by producing a short pressure pulse in gas being used in the welding operation.

4. A method as claimed in claim 1, 2, or 3, in which the radiation detected is light emitted by the arc.

5. A method as claimed in claim 1, 2, or 3, in which the radiation detected is an acoustic signal emitted by the arc.

6. A method as claimed in claim 1, in which the carrier signal has a frequency of at least about 100 Hz.

7. A method as claimed in claim 1, in which the analyzing is effected using a computer.

8. A method as claimed in claim 1, further comprising controlling the welding operation in accordance with the results of the analysis.

9. Arc welding apparatus comprising means for forming an arc to produce a weldpool; means for positively superimposing a carrier signal on the arc current; vibration means for causing the weldpool to vibrate so as to modulate the superimposed carrier signal; radiation detection means for detecting radiation emitted by the arc; and processing means for analyzing the modulation of the detected radiation to obtain details of parameters of the weldpool.

10. Apparatus as claimed in claim 9, in which the vibration means comprises means for producing a pulse in the welding current.

11. Apparatus as claimed in claim 9, in which the vibration means comprises means for producing a short pressure pulse in gas being used in the welding operation.

12. Apparatus as claimed in claim 9, 10, or 11, in which the detection means comprises an optical fiber cable arranged to detect light emitted by the arc.

13. Apparatus as claimed in claim 9, 10, or 11, in which the detection means comprises a microphone arranged to detect an acoustic signal emitted by the arc.

14. Apparatus as claimed in claim 9, in which the processing means comprises a computer.

15. Apparatus as claimed in claim 9, further comprising control means for automatically controlling the operation of the arc welding apparatus in response to the output of the processing means.

* * * * *